US009137428B2

(12) United States Patent
Khawand et al.

(10) Patent No.: US 9,137,428 B2
(45) Date of Patent: Sep. 15, 2015

(54) STORYBOARDS FOR CAPTURING IMAGES

(75) Inventors: Charbel Khawand, Sammamish, WA (US); Robert Milausnic, Bellevue, WA (US); Junghwan Moon, Bellevue, WA (US); Denis Demandolx, Bellevue, WA (US); Steve Glenner, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 218 days.

(21) Appl. No.: 13/487,031

(22) Filed: Jun. 1, 2012

(65) Prior Publication Data
US 2013/0321647 A1 Dec. 5, 2013

(51) Int. Cl.
*H04N 5/222* (2006.01)
*H04N 5/232* (2006.01)

(52) U.S. Cl.
CPC .......... *H04N 5/222* (2013.01); *H04N 5/23222* (2013.01); *H04N 5/23203* (2013.01)

(58) Field of Classification Search
None
See application file for complete search history.

(56) References Cited

U.S. PATENT DOCUMENTS

| 4,858,012 | A  | * | 8/1989 | Hino et al. ................. 348/211.6 |
| 5,604,857 | A  |   | 2/1997 | Walmsley |
| 6,069,655 | A  | * | 5/2000 | Seeley et al. ................. 348/154 |
| 6,256,059 | B1 | * | 7/2001 | Fichtner ..................... 348/222.1 |
| 6,373,507 | B1 | * | 4/2002 | Camara et al. ............... 715/825 |
| 6,647,535 | B1 |   | 11/2003 | Bozdagi et al. |
| 6,686,970 | B1 |   | 2/2004 | Windle |
| 6,771,801 | B1 |   | 8/2004 | Fisher et al. |
| 7,701,483 | B1 | * | 4/2010 | Takiguchi et al. ........ 348/207.11 |
| 7,868,916 | B2 | * | 1/2011 | Kawashima ............... 348/207.2 |
| 8,484,261 | B2 | * | 7/2013 | Takahashi ..................... 369/125 |
| 2002/0196197 | A1 | * | 12/2002 | Watanabe ..................... 345/1.1 |
| 2004/0083015 | A1 | * | 4/2004 | Patwari .......................... 700/90 |
| 2004/0109063 | A1 | * | 6/2004 | Kusaka et al. ............. 348/207.1 |
| 2004/0212687 | A1 | * | 10/2004 | Patwari .................... 348/211.13 |
| 2004/0223057 | A1 | * | 11/2004 | Oura et al. ................. 348/207.1 |
| 2004/0246358 | A1 | * | 12/2004 | Isoyama .................. 348/333.01 |
| 2005/0237391 | A1 | * | 10/2005 | Shibuya et al. ............ 348/207.1 |

(Continued)

FOREIGN PATENT DOCUMENTS

WO WO 2008/024891 A2 2/2008

OTHER PUBLICATIONS

International Search Report and Written Opinion, corresponding International Application No. PCT/US2013/041917, dated Aug. 8, 2013, 10 pages.

(Continued)

*Primary Examiner* — Michael Osinski
(74) *Attorney, Agent, or Firm* — Jim Banowsky; Kate Drakos; Micky Minhas

(57) ABSTRACT

Disclosed herein are representative embodiments of tools and techniques for using storyboards in controlling a camera for capturing images, photographs, or video. According to one exemplary technique, at least two storyboards are stored. In addition, at least one storyboard identifier from a camera application is received. Also, using the storyboard identifier, a storyboard of the stored at least two storyboards is retrieved. The retrieved storyboard includes a sequence of control frames for controlling a camera. Additionally, a sequence of image frames is captured at least by controlling a camera using the retrieved storyboard.

18 Claims, 10 Drawing Sheets

(56) References Cited

U.S. PATENT DOCUMENTS

| | | |
|---|---|---|
| 2006/0140620 A1* | 6/2006 | Fujii .............................. 396/287 |
| 2006/0284978 A1 | 12/2006 | Girgensohn et al. |
| 2007/0064113 A1* | 3/2007 | Lee .......................... 348/207.99 |
| 2007/0200872 A1 | 8/2007 | Bowie et al. |
| 2008/0007567 A1 | 1/2008 | Clatworthy et al. |
| 2008/0052026 A1* | 2/2008 | Amidon et al. ................ 702/104 |
| 2010/0020220 A1* | 1/2010 | Sugita et al. .............. 348/333.01 |
| 2010/0026843 A1* | 2/2010 | Tezuka et al. ............... 348/231.2 |
| 2010/0115410 A1 | 5/2010 | Fu et al. |
| 2010/0157084 A1* | 6/2010 | Shimamura et al. ........ 348/222.1 |
| 2010/0194963 A1* | 8/2010 | Terashima ............... 348/333.11 |
| 2011/0096197 A1* | 4/2011 | Kusaka et al. ............. 348/231.5 |
| 2012/0268615 A1* | 10/2012 | Choi et al. ................ 348/211.99 |
| 2013/0222628 A1* | 8/2013 | Koike ........................ 348/211.2 |

OTHER PUBLICATIONS

"CCD Camera ISP (Image Processors)", Published on: Sep. 11, 2010, Available at: http://www.zilica.com/CCDCameraISP.php?PHPSESSID=54bb267df9b58ac51dbc1b2aceb03fe3, 4 pages.

"The Frankencamera: An Experimental Platform for Computational Photography," *SIGGRAPH '10 Special Interest Group on Computer Graphics and Interactive Techniques Conference*, Los Angeles, CA, USA, Jul. 26-30, 2010, 12 pages.

"FCam: An API for controlling computational cameras," http://graphics.stanford.edu/papers/fcam/html/main.html, Jul. 15, 2010, 5 pages.

"FCam: An API for controlling computational cameras," http://harmattan-dev.nokia.com/docs/library/html/fcam/main.html?tab=1, accessed on the internet Apr. 4, 2012, 4 pages.

\* cited by examiner

STORYBOARDS FOR CAPTURING IMAGES

BACKGROUND

As the popularity of digital photography has increased in today's world, various devices have been adapted to incorporate digital cameras for capturing digital photographs. Some traditional digital photography solutions have allowed a user to capture a still photograph by pressing a shutter button to signal a camera to capture the photograph. Also, some solutions have allowed for the capture of consecutive photographs by allowing a user to press a shutter button repeatedly to capture the photographs. Allowing for faster and more complex functionality, in digital photography, has been limited in these traditional solutions, in part, due to speed requirements for sending information, for taking a photograph, to a camera.

SUMMARY

Among other innovations described herein, this disclosure presents various representative embodiments of tools and techniques for using storyboards in controlling a camera for capturing images, photographs, or video.

In one embodiment, an application can compose a set of storyboard control frames that can be passed and stored by a camera driver during an initialization period, prior to receiving commands to execute the storyboard. Using this structure, applications can build extensive imaging controls for multi-shot or a stream of images to be captured automatically by the camera driver. The storyboards can be identified using storyboard identifiers. For taking multiple shots, the application can pass the storyboard identifier to the driver, which can then use the identifier to access the storyboard and initiate the multiple shots associated with the storyboard. The storyboards can include adaptive controls that can dynamically modify how the sequence of images are captured. For example, loops, conditional delays, and customized payloads are examples of dynamic control that can be implemented.

According to another exemplary technique, at least two storyboards are stored. In addition, at least one storyboard identifier from a camera application is received. Also, using the storyboard identifier, a storyboard of the stored at least two storyboards is retrieved. The retrieved storyboard includes a sequence of control frames for controlling a camera. Additionally, a sequence of image frames can be captured at least by controlling a camera using the retrieved storyboard. For example, the storyboard can be executed by a device driver to at least control a camera to capture a sequence of images.

In another exemplary technique described herein, at least one storyboard is sent from an application to a device driver. In addition, using the device driver, the at least one storyboard is cached. Also, a request to execute the at least one storyboard is received from the application at the device driver. Additionally, using the device driver, a plurality of image frames is captured at least by executing at least one control frame of the at least one storyboard.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

Exemplary Method of Controlling a Camera to Capture a Sequence of Images

Figure 1:
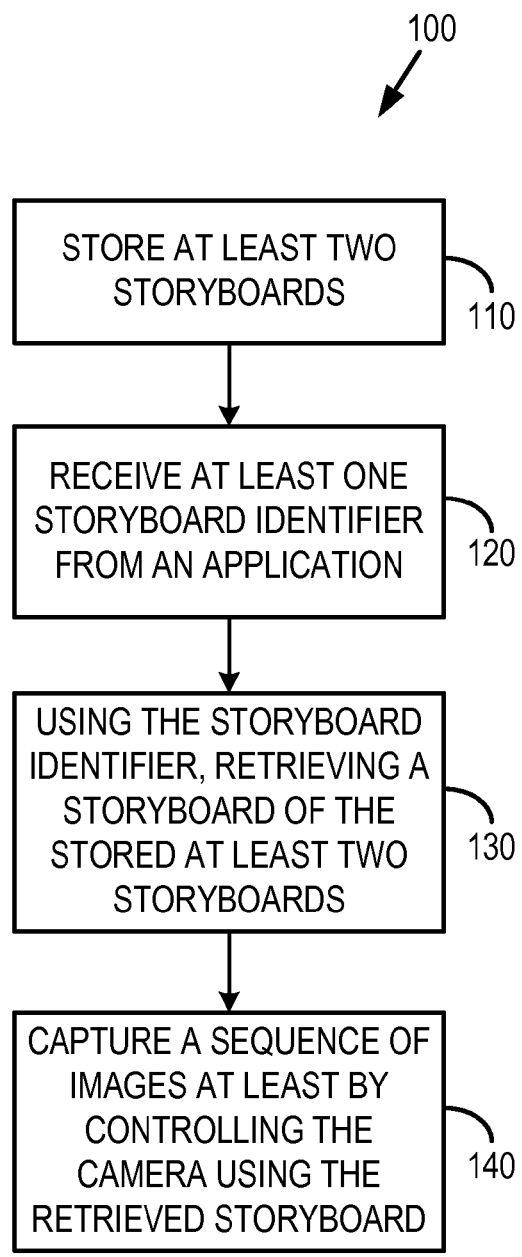
FIG. 1 is a flowchart of an exemplary method of controlling a camera to capture one or more images.

FIG. 1 is a flowchart of an exemplary method 100 of controlling a camera to capture one or more images in a sequence. In FIG. 1, at least two storyboards are stored at 110. For example, two or more storyboards sent from one or more applications can be received by a device driver and the storyboards can be cached or otherwise stored in memory by the device driver for later use. That is to say an application, during an initiation phase, can send a storyboard to a device driver that includes instructions to control a camera before the device driver begins capturing images using the storyboard. After the initiation phase is complete, during a capture phase, at 120, at least one storyboard identifier from an application is received. For example, an application running on a device can send an identifier such as a GUID or other identifier that identifies a storyboard stored by a device driver, and the identifier can be received by the device driver on the device. At 130, using the storyboard identifier, a storyboard of the stored at least two storyboards is retrieved. For example, using the storyboard identifier the device driver can retrieve, select, or execute a storyboard stored in a cache of the device driver. At 140, a sequence of images is captured by controlling a camera using the retrieved storyboard. For example, a device driver can execute instructions in the retrieved storyboard at least to control a camera to capture one or more images in a sequence (e.g., a sequence of images). In some implementations, by executing a storyboard, a device driver can synchronize the capturing of one or more image frames with the automatic application of one or more instructions in one or more control frames of the storyboard. Also, image data can be captured by a device driver executing a storyboard, and the image data can be provided to an application by the device driver in one or more storyboard payloads.

Exemplary Implementation of a Storyboard

Figure 2:
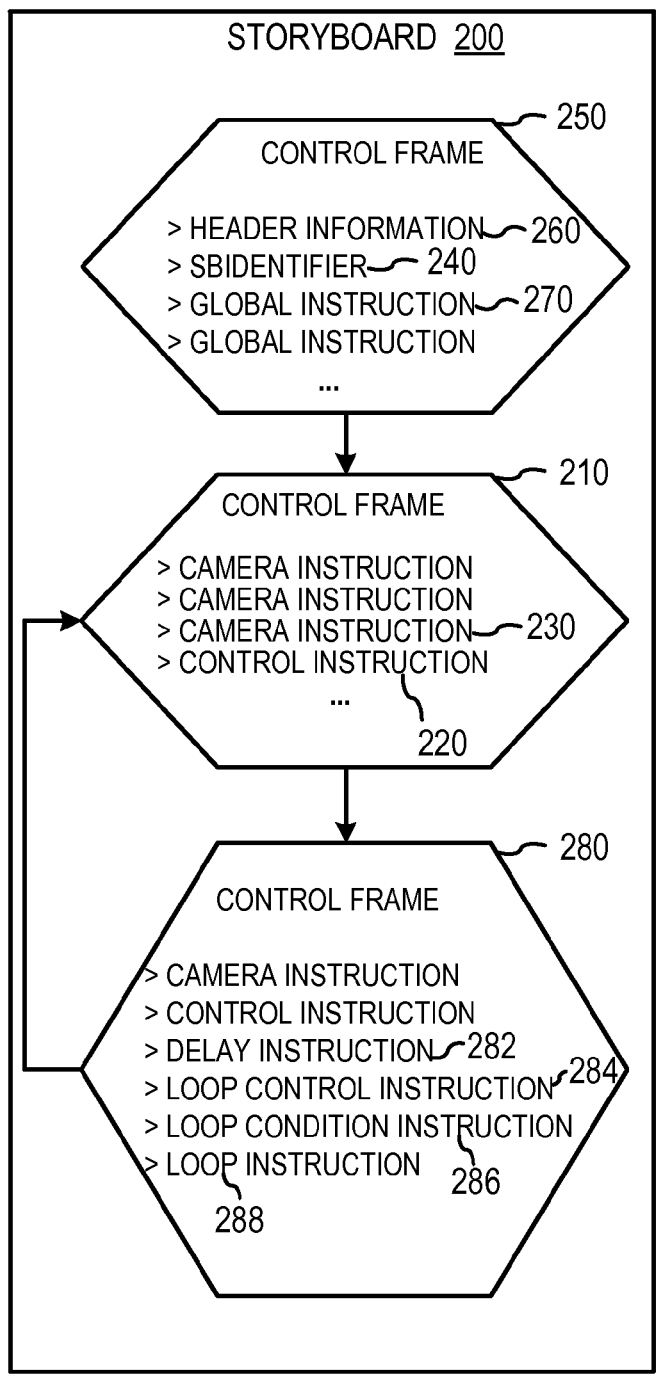
FIG. 2 is a schematic diagram of an exemplary storyboard.

FIG. 2 is a schematic diagram of an exemplary storyboard 200. A storyboard, such as storyboard 200, can be generated or used by an application of a computing device to instruct a device driver to automatically set camera settings or controls for image captures such as for single image shots, multiple image shots, or streams of images that can be captured by a camera. For example, a device driver running on a computing device can be instructed by a storyboard or an application of the computing device using one or more instructions, commands, or requests implemented using one or more application programming interfaces. Storyboards can implement various image capture modes. In some implementations, still capture, preview, and/or video modes of an application or computing device can be implemented using storyboards. In some implementations, a camera application can generate a storyboard with control frames that when executed control a camera to capture images to implement an image capture mode. For example, an image capture mode can include a high dynamic range (HDR) mode, a burst mode, a time shift mode, a 0-shutter lag (ZSL) mode, and/or other modes for capturing images. In one implementation, implementing a burst mode can cause a camera to capture a burst of consecutive still image frames. For example, a burst mode can capture a series of image frames where the camera settings or controls at the time of capture of each image frame are driven by a storyboard executed by a device driver to capture the consecutive still image frames.

The storyboard 200 can include one or more control frames, such as control frame 210. For example, the storyboard 200 can be an array of sets of instructions, where respective sets of instructions are included in respective control frames. In some implementations, the control frames of a storyboard can be ordered in a sequence. The control frame 210 can include a set of instructions to be executed in an order. The instructions included in control frame 210 can include one or more control instructions for controlling execution of a storyboard, such as control instruction 220, and one or more camera instructions, such as camera instruction 230 for controlling one or more settings, controls, parameters, operations, or functionalities of a camera. The control instruction 220 can cause a device driver to modify the order or timing in which control frames are executed. Also, in some implementations, a control instruction in a storyboard can cause a different storyboard to be executed. In some implementations of a control frame execution, the precedence of the application of instructions in a control frame can be based on the order the instructions are included in the control frame. For example, in some implementations, an instruction that is executed and/or parsed last in the order of instructions by a device driver can take precedence over earlier executed or parsed instructions. In some implementations, an instruction can take precedence over another instruction such that the instruction taking precedence is applied to control the camera or execution of the storyboard despite one or more controls, settings, parameters, or functionalities set by a prior executed instruction. For example, a control frame can include instructions in an order such that a set frame rate is maintained by frame rate instructions taking precedence over a shutter speed set by earlier executed instructions of the control frame. Also, for example, a control frame can include instructions in an order such that a set shutter speed is maintained by the shutter speed instructions taking precedence over a frame rate set by earlier executed instructions of the control frame. In some implementations, a storyboard can apply instructions of respective control frames to a camera on a per-image-frame basis. For example, the settings or controls of a camera can be automatically modified or controlled for respective image captures by a device driver automatically applying the instructions of respective control frames to the camera for the respective image captures. Also for example, in some implementations, for individual images captured by a camera, the camera can be controlled by a device driver applying instructions of individual control frames of the storyboard. In some implementations, the application of instructions of one control frame can persist and be applied or persist during the execution of later control frames.

With reference to FIG. 2, storyboard 200 can be identified by and/or associated with a unique identifier, such as storyboard identifier 240. The storyboard identifier 240 can be unique identifier such as a GUID, UUID, or other unique identifier. The storyboard identifier 240 is included in the storyboard 200. In some implementations, when an application creates a storyboard, the storyboard identifier is generated and included in the storyboard by the application. The storyboard identifier can later be used by the application to identify the storyboard. For example, an application can send a storyboard identifier for a storyboard stored by a device driver to request execution of the storyboard.

The storyboard 200 can include a control frame that is a header control frame, such as header control frame 250. A header control frame can be the first control frame in the sequence of control frames of a storyboard. The header control frame 250 includes the storyboard identifier 240 that uniquely identified the storyboard. A storyboard identifier can be associated or assigned to a storyboard type that indicates an image capture mode that the storyboard is designed to implement. The header control frame 250 can contain a header structure 260 that maps the binary data included in the storyboard. The header control frame 250 can include one or more global instructions, such as a global instruction 270.

The global instruction 270 can be applied for one or more control frames of the storyboard when the one or more control frames are executed by the device driver. For example, the global instruction 270 can be applied for each control frame in the storyboard when each control frame is executed. In some implementations, a global instruction can include an image-statistics instruction that includes a flag to enable image statistics to be returned with captured image frame data. Additionally, in some implementations, a global instruction can include a metadata-image-format instruction that can be applied by the device driver so that the device driver receives, for a captured image frame, an instance of the image frame in a raw format as metadata along with the image frame in one or more other formats captured by a camera. In some implementations, a global instruction is consistently applied for one or more control frames of a storyboard and can affect a device driver's execution of the one or more control frames of the storyboard. For example, in the case of the image statistics-instruction value enabling image statistics, image statistics can be returned for each image frame captured using the storyboard and returned to an application after the execution of the storyboard. In some implementations, global instructions can include a value that enables the instruction for application by a device driver or a value that disables the instruction for application by the device driver during the execution of the storyboard.

In FIG. 2, the storyboard 200 includes a control frame 280. A control frame such as control frame 280 can include a set of instructions for a device driver to apply for a capture of an image frame. The control frame 280 can include one or more control instructions, such as a delay instruction 282, a loop control instruction 284, a loop-condition instruction 286, or a loop instruction 288. A control instruction can be used to direct the execution of one or more storyboards by the device driver. In some implementations, during execution of a storyboard, a device driver can apply consecutive control frames to control a camera for capturing image frames without further commands from the application that provided the storyboard. In some implementations, the instructions of control frame 280 can be applied by a device driver using a best effort application or the device driver can wait to execute further instructions or control frames until one or more previously executed instructions are applied and completed.

A control instruction of a storyboard can include a start condition instruction. For example, a start condition instruction can instruct a device driver to delay the start of the execution of a storyboard until some or all of the preceding camera controls, instructions, and/or operations are completed and/or applied. In some implementations, a start condition instruction included in a storyboard is not applicable after the storyboard has begun executing.

In some implementations of executing a storyboard, while the storyboard is executing, asynchronous events from one or more applications may be suspended or ignored, particularly events related to ISP controls. In some implementations, a device driver can cancel or stop the execution of a storyboard before an execution request from an application to execute a new storyboard can be acknowledged by the device driver. A user can check resulting image statistics returned by a storyboard to determine what was actually applied for each control frame that ran. In some implementations of an executing storyboard, general storyboard errors can be sent during the execution of the storyboard. In some implementations, while the storyboard is executing, one or more of the storyboard's instructions cannot be changed and/or one or more of the storyboard's instructions can be changed.

Using the instructions shown in FIG. 2 allows dynamic modifications of the sequence of images (or control parameters thereof) taken by the device driver according to the storyboard without further input from the application.

Exemplary System for Capturing Images

Figure 3:
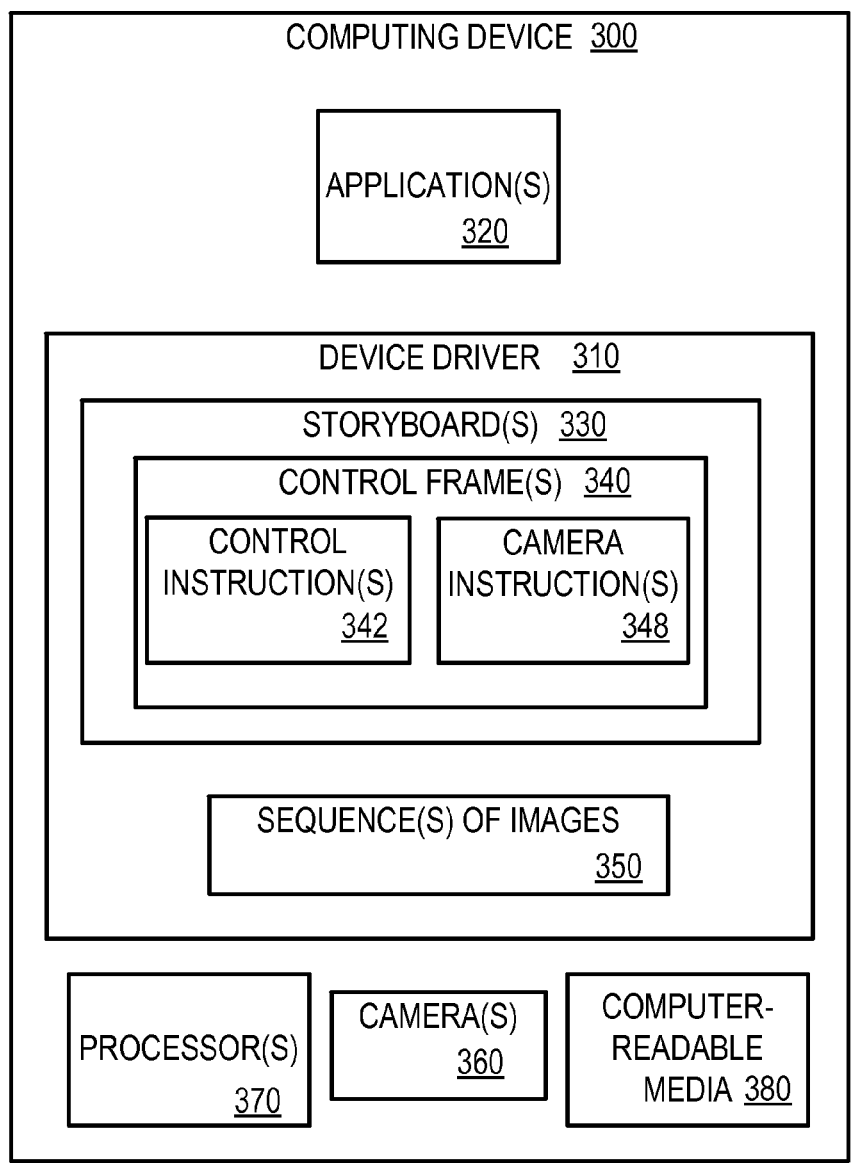
FIG. 3 is a schematic diagram of an exemplary computing device for capturing one or more images.

FIG. 3 is a schematic diagram of an exemplary computing device 300 for capturing one or more images. In FIG. 3, the computing device 300 includes a device driver 310. The device driver can store and can execute one or more storyboards 330. For example, the device driver can store the one or more storyboards in a cache or a memory store of the device driver. The device driver 310 can retrieve a storyboard of the one or more storyboards 330 for execution after the one or more storyboards 330 are stored. The computing device 300 can include one or more applications 320. The one or more applications 320 can generate and/or provide one or more storyboards to implement one or more image capture modes or to capture images by controlling a camera. For example, the camera can be controlled with a device driver that can automatically execute instructions from a storyboard without using further instructions or controls sent from the application during image capture. The one or more applications can send one or more of the one or more storyboards 330 to the device driver 310 which can receive and store the one or more storyboards 330.

The one or more storyboards 330 can include one or more control frames 340. The one or more control frames 340 can include one or more instructions such as control instructions 342 and/or camera instructions 348. The camera instructions 348 can be applied by the device driver 310 to set one or more parameters or settings or to execute one or more functionalities or operations of the one or more cameras 360. For example, the camera instructions 348 can be executed and applied to set one or more settings and/or cause the performance of one or more functionalities of a camera or device included in a camera. By including an instruction in a control frame of a storyboard, an application or user can electively set, use, enable, disable, or lock one or more settings, functionalities or operations of a camera. For example, instructions included in a control frame of a storyboard can enable, disable, or lock various automatic functionalities or operations of a camera such as an exposure, a white-balance operation, a focus, a zoom, or the like. The one or more cameras 360 can generate image data such as by capturing one or more sequences of images 350. For example, the one or more sequences of images 350 can include a sequence of image frames captured by the camera. In some implementations, image data can include image statistics and/or contextual information associated as well as respective captured image frames such as photographs. For example, the device driver 310 can synchronize the capture of photographs with the capture of additional contextual information from one or more other devices or components of the computing device that includes the device driver. In some implementations, a device driver of a computing device can collect contextual information such as global positioning system (GPS) data, acceleration information from an accelerometer, and other information available from the computing device concurrently with the capturing of an image. The contextual information can be associated with the image and included as metadata in a payload associated with the image frames of the image that are generated and returned by the device driver. The contextual information can be used by one or more image processors or one or more applications to process the image data after it is returned by the device driver. In some implementations, the statistics information and/or the contextual information can be used to alter the instructions or instruction values of a storyboard or the execution of a storyboard when they are received by an application or a device driver.

In FIG. 3, the one or more cameras 360 can send image data which can be received by the device driver 310. For example, during the execution of a storyboard, the one or more cameras 360 can send one or more images in one or more sequences of images to the device driver 310. A camera of the one or more cameras 360 can capture images, image data, and/or image frames. For example, an image frame can be a digital photograph or image data captured by a camera. Also, the one or more cameras 360 can send images along with associated image statistics for respective images. A camera of the one or more cameras 360 can include one or more camera devices, such as a sensor, an image signal processor (ISP), a flash, a lens, or other camera devices used in capturing images. Additionally, as shown in FIG. 3, the computing device 300 includes one or more processors 370 and computer-readable media 380. The loops and other instructions described herein can respond to parameters provided by the camera 360 to dynamically modify the instruction sequence or execution.

Exemplary Method of Capturing Image Frames at Least Using a Control Frame

Figure 4:
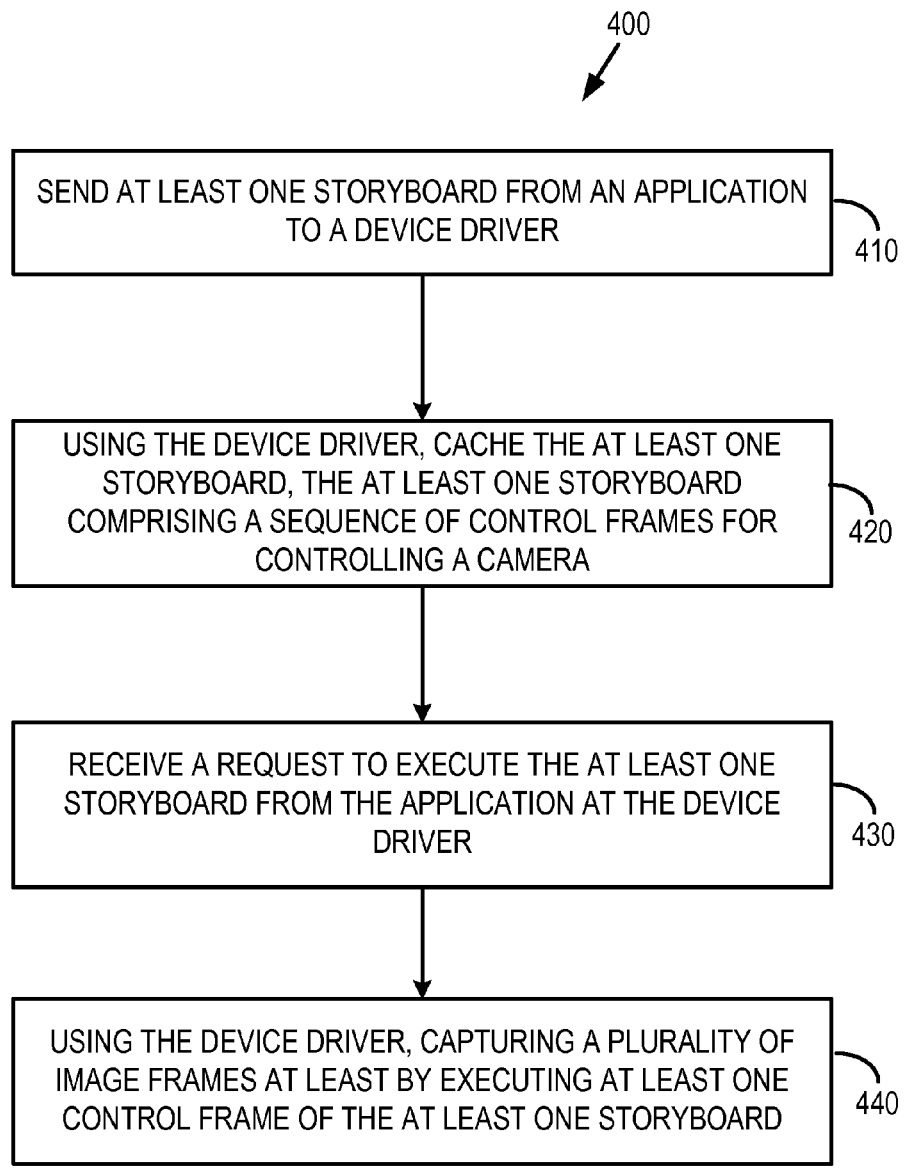
FIG. 4 is a flowchart of an exemplary method of capturing image frames using at least one control frame of a storyboard.

FIG. 4 is a flowchart of an exemplary method 400 of capturing image frames at least by using at least one control frame of at least one storyboard. In FIG. 4, at least one storyboard is sent from an application to a device driver at 410. At 420, using the device driver, the at least one storyboard is cached. For example, the at least one storyboard can include a sequence of control frames for controlling a camera. For example the control frames can include one or more control instructions and/or one or more camera instructions that can be executed by a device driver to control a camera. At 430, a request to execute the at least one storyboard is received from the application at the device driver. At 440, using the device driver, a plurality of image frames is captured at least by executing at least one control frame of the at least one storyboard.

Exemplary System for Capturing Images Using a Storyboard

Figure 5:
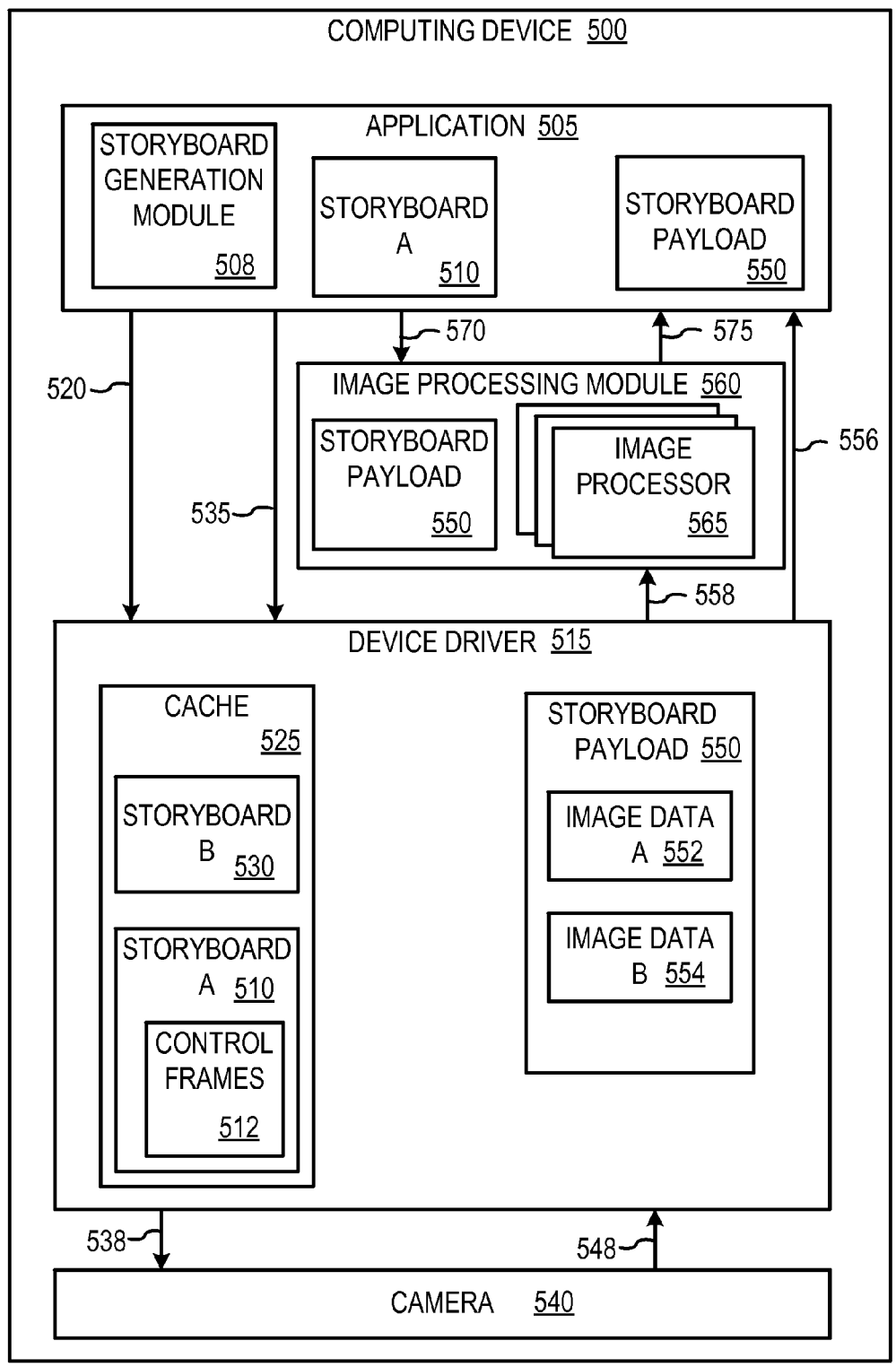
FIG. 5 is a schematic diagram of an exemplary computing device for capturing images using a storyboard.

FIG. 5 is an exemplary computing device 500 for capturing images using a storyboard. As shown in FIG. 5, the computing device 500 includes one or more applications, such as application 505. The application 505 can be a program, software, mobile application, or other application that can run on computing device 500. For example, the application 505 can be a camera application that allows for the viewing, capture, processing, or display of photographs, images, or video captured by the camera 540 of computing device 500. The application 505 can be run on an operating system of the computing device 500. As shown in FIG. 5, the application 505 includes one or more storyboards, such as storyboard 510. The application 505 includes a storyboard generation module 508 that can be used to generate or modify a storyboard. For example, the application generation module 508 of the application 505 can be accessed by a user through a user interface, and the user can use the user interface to build or generate a storyboard such as a storyboard that implements an image capture mode. In some implementations, the user interface can provide one or more available camera parameters, settings, functionalities, operations, or a combination thereof for a user to set for one or more control frames in the generation of a custom storyboard. Also, the storyboard generation module 508 can allow for the setting of global instructions and the use of control instructions to build various types of storyboards that can implement various image capture modes or custom storyboards. In some implementations, one or more storyboards can be included in an application such that they are preconfigured so that the storyboards can be used to implement the available image capture modes selectable for the application. Also, by providing or generating a storyboard an application can specify a series of control frames for applying different camera controls and/or camera configurations to capture respective image frames or video and associated data.

With reference to FIG. 5, the application 505 sends the storyboard 510 to device driver 515 as shown at 520. The device driver 515 stores the storyboard 510 in a memory store of the device driver 515 such as an internal cache 525. The cache 525 can store one or more storyboards such as storyboard 510 and storyboard 530. In some implementations, storyboards stored in the cache 525 can be read and applied by the device driver 515 to implement one or more camera modes including a preview mode, a still mode, a video mode, or other camera mode. For example, a still mode can capture still images, and a video mode can capture images for video. When a device driver stores a storyboard, a service layer or application can query the device driver for a resource estimate of the stored storyboard. In one implementation, a device driver can generate a resource estimate at least in part by parsing a header and/or frames of the storyboard. In one implementation a resource estimate can be expressed in a number of bytes.

Additionally, the application 505 can send an execute request 535 to execute storyboard 510 that can be received by device driver 515. In some implementations, before, along with, or after a request to execute a storyboard is sent, memory resources (e.g., driver capture buffers) can be sent to the device driver to store data captured during execution of the storyboard such as image data and associated metadata or image statistics. In some implementations, an application can set an identified storyboard as an active storyboard using a set active request that includes a storyboard identifier identifying the storyboard to be set active. A storyboard that is an active storyboard can be executed when an execute request is received. As shown at 570, when an execute request 535 to execute a storyboard is sent to a device driver, one or more image processors can be setup to process image data that can be returned after the execution of the storyboard identified in the execution request.

In some implementations, an execute request can be a trigger request. For example, the trigger request can include a start value that triggers the start of a storyboard in the device driver. A trigger request can be sent to the device driver from an application. In some implementations, a trigger request can include a value that can cause the execution of a storyboard to start, stop, or be canceled. Also, a trigger request can include a stop-loop value that can stop a looping of the execution of a sequence of control frames of a storyboard from continuing. When a trigger request which includes a cancel value is received, the device driver can stop execution of a storyboard and can return to a predetermined or default state such as a state that the device driver was in before beginning execution of the canceled storyboard. In some implementations, when an execution of a storyboard is canceled with a trigger request, the image data or storyboard payload captured during execution of the storyboard is not returned to an application by the device driver after the storyboard execution is canceled. When a trigger request which includes a stop-loop value is received, the device driver can cancel the loop execution, finish execution of the currently executing control frame, and then continue to execute the storyboard from the control frame after the control frame that included the loop instruction that initiated the loop. When a trigger request which includes a stop-loop value is received by a device driver, if there is no control frame after the control frame that included the loop instruction that initiated the loop, then the device driver can terminate the execution of the storyboard. When a trigger request which includes a stop value is received by a device driver, the device driver can terminate the currently executing frame and return the storyboard payload generated using the storyboard. Additionally, when a trigger request which includes a start value is received, the device driver can begin to execute the storyboard identified by a storyboard identifier. For example, an application can be launched and the application can send an identified storyboard to a device driver and when a shutter button of the device is pressed a trigger request can be sent to the device driver to start the execution of the identified storyboard.

With reference to FIG. 5, responsive to the execute request 535 the device driver 515 executes the storyboard 510. For example, when the execute request is received by the device driver, device driver begins execution of the storyboard. In some implementations, the storyboard 510 can be previously selected and ready for execution. In other implementations, the storyboard 510 can be identified by a storyboard identifier included in the execution request and the storyboard can by selecting or retrieving for based on the storyboard identifier. In the execution of storyboard 510 the device driver 515 can execute one or more of the control frames 512 included in the storyboard 510. During execution of the storyboard 510 the device driver can control one or more cameras, such as camera 540. Controlling the camera 540 can include setting one or more parameters or settings of one or more camera devices of the camera 540 and/or causing one or more functionalities of the camera 540 to be performed. The camera 540 can capture image data such as one or more images and can send the image data to the device driver 515 as shown at 548. Also, during execution of the storyboard 510 one or more control instructions of the storyboard 510 can control the timing and/or order of the execution of one or more of the control frames 512. Respective control frames of the control frames 512 can be executed to capture respective image frames which can be received and stored in a memory store by the device driver 515. For example, while the storyboard 510 is executing the device driver 515 automatically synchronizes image frame captures with the application of instructions of control frames that set camera settings. The synchronization done by the device driver 515 during execution of the storyboard 510 can be done without further instructions, information, or commands for controlling the camera 540 from the application 505. The device driver 515 can store the image data received such as image data 552 and 554. In some implementations, if a storyboard instructs the device driver to return image statistics with the image frames, the device driver can append image statistics received from a camera for one or more image frames captured during execution of the storyboard. As shown in FIG. 5, using the received image data, the device driver 515 can generate one or more storyboard payloads such as storyboard payload 550.

The storyboard payload 550 includes image data, such as image data 552 and image data 554. After the storyboard 510 has completed executing, the device driver 515 can return data for the storyboard such as image frames stored in pre-allocated memory. That is to say, the device driver 515 can send captured image data and associated metadata and/or image statistics to application 505 as shown at 556. For example the device driver 515 can send the storyboard payload 550 to the application 505. As shown at 558, the device driver can send captured image data and associated metadata and/or image statistics to an image processing module 560 that can process image data using one or more image processors such as image processor 565. For example, the device driver can send the storyboard payload 550 to image processing module 560 that can filter image data of the storyboard payload using image processor 565. In some implementations, image statistics included in a storyboard payload for an image frame can be used by image processors or filters to enhance image processing or filtering. As shown at 570, the application 505 can send information to the image processing module 560 to organize or configure one or more image processors to process an image data captured for an identified storyboard. After image data is processed by the image processing module, the image processing module 560 can send the image data such as storyboard payload 550 to the application 505 as shown at 575.

Exemplary Implementation of Storyboard Execution

Figure 6:
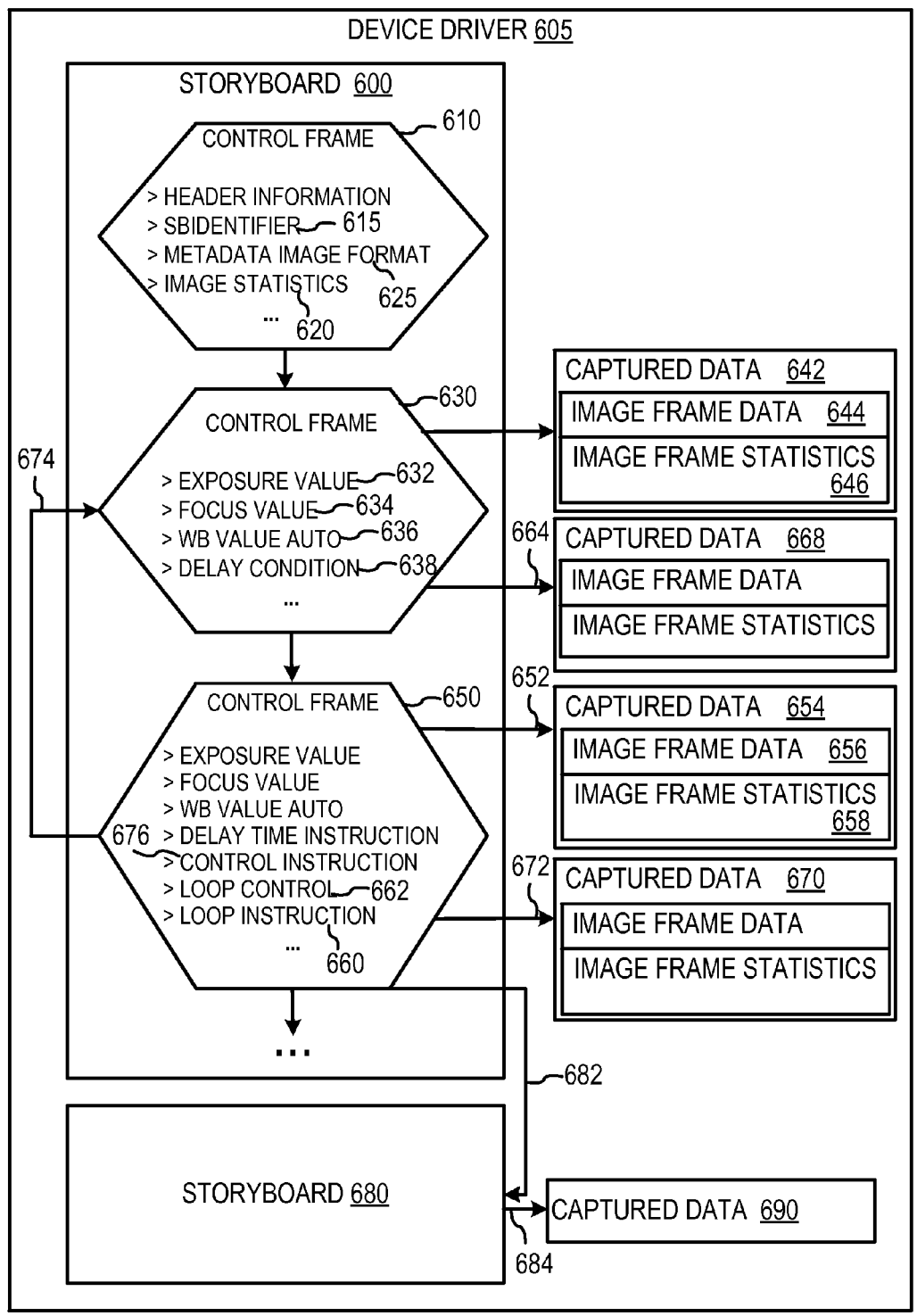
FIG. 6 is a diagram illustrating an exemplary implementation of an execution of storyboards.

FIG. 6 is a diagram illustrating an exemplary implementation of an execution of storyboard 600 and storyboard 680 by device driver 605. In FIG. 6, the device driver 605 begins the execution of storyboard 600 by reading and applying the instructions of the header control frame 610. The header control frame 610 includes a storyboard identifier 615, an image statistics instruction 620, and a metadata-image-format instruction 625. The storyboard identifier 615 uniquely identifies the storyboard 600. The device driver 605 can include the storyboard identifier 615 with captured data to associate the captured data with the storyboard 600.

The control frame 610 includes image statistics instruction 620. The image statistics instruction 620 can include one or more values that identify a set of image statistics that are captured by the device driver for respective image frames captured while the storyboard is executed. In some implementations, image statistics include a histogram, ISP controls, exposure data, sensor gain information, or other image statistics available from a camera. In some implementations, a set of image statistics for a storyboard can be selected to be collected and returned by a device driver by setting the one or more values of an image statistics instruction. The image statistics instruction 620 can be a global instruction and can be applied to data captured for each control frame of the storyboard 600. In other implementations, an image statistics instruction can be applied to one or more control frames of a storyboard. In some implementations, values for image statistics instructions can include an image-data value, a camera-metadata value, a camera-applied-parameters value, a camera all parameters value, a value for exchangeable image file format (Exif) data, and/or other values. An image-data value can indicate that the storyboard payload from the device driver contains an image buffer. A camera-metadata value can instruct a device driver to return ISP metadata with an image frame captured with the storyboard. For example, ISP metadata can include a histogram indicating the distribution of the intensity of the pixels of a photograph and the histogram can be included in a storyboard payload along with the photograph data. A camera-applied-parameters value can instruct a device driver to return values of camera settings and/or parameters that were applied to the camera by executing the control frame used for capturing the associated image frame. A camera-all-parameters value can instruct a device driver to return some or all values of camera settings and/or parameters used for capturing an image frame. An Exif data value can instruct a device driver to include exchangeable image file format (Exif) data for a captured image frame with the image frame when the image frame is returned. For example, the Exif data for an image frame can be returned to an application in a storyboard payload with the image frame.

The storyboard 600 includes a metadata-image-format instruction 625. In some implementations, by using a metadata-image-format instruction in a storyboard, an application can select or electively request an image frame (e.g., an image frame output from an ISP) in a format from one or more formats generated at different levels of processing. In some implementations, a metadata-image-format instruction includes one or more values that indicate one or more image formats in which an image frame is to be included in metadata that is returned by a device driver for an executed storyboard. For example, the image frame formatted according to the metadata-image-format instruction can be returned in a storyboard payload with the image frame formatted in a predetermined or negotiated image data type or format (e.g., NV12 or other format). In some implementations, a value of a metadata-image-format instruction can indicate a pre-demosaiced raw format, an idealized pre-demosaiced raw format, a demosaiced format, or other format. A pre-demosaiced raw formatted image frame comprises the image frame in a raw Bayer format or a native format of a sensor of a camera. An idealized pre-demosaiced raw formatted image frame comprises an image frame that has been processed by a camera's ISP but is in a pre-demosaiced format. In some implementations, the format and contents of raw formatted image frames included as metadata can be formatted as provided by the capabilities of a camera.

In FIG. 6, after executing the header control frame 610, the device driver 605 continues execution of the storyboard 600 by reading and applying the instructions of control frame 630. The control frame 630 includes a camera instruction 632 that is executed such that the device driver 605 sets an exposure value of the camera controlled by the device driver 605. Also, the camera instruction 634 is executed such that the device driver controls the camera to perform an automatic focus operation that automatically focuses the camera. In addition, the camera instruction 636 is executed such that the device driver 605 controls the camera to perform an automatic white-balance operation that automatically adjusts the white balance for the camera. Further, the device driver 605 executes the delay-condition instruction 638 and delays the execution of control frame 650 until the automatic focus operation begun by the camera instruction 634 is completed. As shown at 640, the execution of the control frame 630 causes the camera to capture an image frame and generate captured data 642 that includes image frame data 644 for an image frame in one or more formats and image frame statistics 646 for the captured image frame.

After the execution of control frame 630 is completed and the delay condition of the delay condition 638 is satisfied, the device driver executes control frame 650. As shown at 652, the execution of the control frame 650 causes the camera to capture an image frame and generate captured data 654 that includes image frame data 656 for an image frame in one or more formats and image frame statistics 658 for the captured image frame. The control frame 650 includes a loop instruction 660 that includes values that cause the device driver 605 to execute the sequence of control frame 630 and 650 once as shown at 674. The loop control instruction 662 indicates that the device driver is to loop back 1 control frame from control frame 650 to apply the loop instruction 660 and begin the loop at control frame 630. As shown at 664, the execution of the control frame 630 in the loop causes the camera to generate captured data 668, and the execution of the control frame 650 in the loop causes the camera to generate captured data 670 as shown at 672. After the loop of storyboard 600 is executed once, the device driver is instructed by the control instruction 676 to cascade execution which ends the execution of storyboard 600 and begins execution of storyboard 680 as shown at 682. The control instruction 676 instructs the device driver to modify the device driver's execution, and as shown at 684, the execution of storyboard 680 generates image data such as captured data 690. In some implementations, a control instruction can instruct a device driver to modify the device driver's execution automatically based on a condition. For example, a delay instruction can cause a device driver to stop executing a storyboard designed for capturing images in good lighting conditions and begin executing a storyboard designed for capturing images in low light conditions if the delay condition cannot lock or is not satisfied, such as if a focus operation of the camera cannot complete due to low light. In some implementations, a control instruction can cause a device driver to modify the execution of a currently executing storyboard. For example a control instruction can cause a device driver to skip one or more control frames before executing a control frame, or to next execute a control frame that is a number of control frames ahead in the sequence of control frames. In some implementations, a control instruction can cause the device driver to cascade execution between storyboards such that the storyboards can be executed in combination automatically without direction from an application. Also, a control instruction can cause the execution of a different storyboard that implements an image capture mode. For example, a first storyboard can instruct a device driver to go to a sports mode and the device driver can begin execution of a storyboard that is designed to capture images from sporting events.

Exemplary Instructions for Looping Execution of Control Frames

In any of the examples herein a storyboard can include one or more control instructions such as one or more a loop instructions. For example, a loop instruction can cause the device driver to repeat execution of a series of consecutive control frames in the storyboard one or more times. A loop instruction can cause the device driver to modify the order the control frames are executed or modify the order of the instructions within a control frame. During the execution of a loop within the storyboard, the device driver executes a portion of the storyboard that begins with an indicated control frame and ends with the control frame that includes the loop instruction. In some implementations, a loop instruction can direct execution of the storyboard to a control frame indicated in a loop control instruction. For example, a loop instruction can instruct a device driver to loop execution of control frames by directing execution of the storyboard to go back from the control frame with the loop instruction to next execute a previous control frame indicated in a loop control instruction. Then the device driver can continue to execute the storyboard from the indicated previous control frame until it again reaches the control frame that includes the loop instruction. A loop instruction can continue to cause the device driver to loop execution of a series of control frames until the looping is stopped, until a loop count is reached, or one or more conditions are satisfied such as one or more conditions indicated in a loop-condition instruction or other condition. That is to say one or more sequences of control frames of a storyboard can be repeated once, more than once, or continuously until stopped. A loop instruction of a storyboard can be included in any of the control frames of the storyboard. In some implementations, a loop instruction can be the last instruction executed in the execution of a control frame. In other implementations, a loop instruction is executed before or after other instructions of a control frame. In some implementations, a loop instruction can be used to implement a 0-shutter lag (ZSL) mode which causes a continuous looping between one or more control frames within a storyboard until the capturing of a photo or image frame is triggered. For example, a ZSL mode can capture a still image from scenes running prior to a trigger such as a trigger caused by a trigger request. Also, a loop instruction can be used in a storyboard that implements a mode that captures a series of images using a 0-shutter lag followed by a burst. For example, a storyboard can include instructions that execute to implement a ZSL mode then after an image capture is triggered the further execution of the storyboard automatically executes to capture a series of consecutive images in a burst. When a storyboard with a loop is executed, the captured image data can be sent from the device driver in one or more storyboard payloads after the whole storyboard has completed executing. For example, the image data captured for an executed storyboard that contains a loop instruction can be stored in allocated memory for the device driver such as a rolling buffer and can be returned in one or more storyboard payloads after the execution of the whole storyboard completes.

In some implementations, a loop instruction can include a loop count and the loop instruction can continue to cause the storyboard to loop until the number of loops meets or exhausts the loop count. In some implementations, a loop instruction can indicate that a looping is not to be done. For example, a loop instruction can include a value or flag that can be set to indicate to the device driver that no loop is to be done based on the loop instruction. In some implementations, when a storyboard that includes a loop instruction is executed a device driver can generate output such as a storyboard payload after a stop command is received or a loop count of the loop instruction is reached or exhausted. Additionally, a loop instruction can instruct a device driver to continue to loop within the storyboard until the device driver is instructed to stop the looping or until a condition is met.

In some implementations, a loop instruction instructs the device driver executing a storyboard to loop back from an executing control frame to a control frame indicated in a loop control instruction. For example, a loop control instruction can indicate, to a device driver, where the series of control frames to be executed for the loop begins in the storyboard. That is to say, a loop control instruction can instruct the device drive what previous control frame is the first control frame in the series of control frames to be executed in the loop. In some implementations, a loop control instruction can indicate to re-execute the currently executing control frame. For example, the loop control instruction can indicate that the control frame that includes the loop control instruction is to be executed again after the current execution of the control frame completes. A loop control instruction can indicate to loop back to the control frame located a number of control frames previous from the currently executing control frame. In one implementation, if the loop control instruction indicates to loop back a number of control frames that is larger than the number of control frames previous to the currently executing control frame, then the device driver is instructed to loop to the first control frame of the storyboard. In some implementations, a loop control instruction can indicate to loop back to the first control frame and/or the starting control frame of the storyboard.

In some implementations, a loop-condition instruction instructs a device driver executing a storyboard to continue looping execution of a series of control frames until one or more conditions are satisfied. For example, the loop instruction can instruct a device driver to continue executing a sequence of control frames repeatedly within a storyboard until a condition is met. A loop-condition instruction can include one or more values that indicate the one or more loop conditions to end a looping based on a loop-condition instruction. Values of a loop-condition instruction can be used in combination to indicate one or more conditions to be satisfied before ending a loop within a storyboard. In some implementations, a loop instruction can continue to cause a device driver to repeat execution of a sequence of control frames within the storyboard until one or more camera operations started in an executed control frame are completed. For example camera operations can include a focus operation, an exposure operation, a zoom operation, an operation to adjust a white balance, or an operation to charge and/or ready a flash. In some implementations, a device driver continues to loop within a storyboard until one or more combinations of conditions are satisfied. That is to say, a loop-condition instruction can include one or more values that indicate some or all conditions that are to be satisfied before a looping within the storyboard can end. In some implementations, a loop-condition can be ended or overridden by one or more operations such as a timeout, a stop, or a cancel.

Exemplary Instructions for Delaying the Execution of a Control Frame

In any of the examples herein a control frame of a storyboard can include one or more control instructions such as one or more delay instructions. In some implementations, a delay instruction can allow a user generating a storyboard to specify an inter-frame delay that can be enforced or not enforced such as depending on one or more conditions. For example, a delay instruction can include a delay-time instruction or a delay-condition instruction. A delay-time instruction can include a value that indicates an amount of time that the executing device driver can delay execution of the next control frame to be executed in the storyboard. For example, the amount of time to delay indicated by a delay-time instruction can be a time to delay the execution of the next control frame as measured from the beginning of an exposure of the control frame that includes the delay-time instruction. In other implementations, the amount of time to delay indicated in a delay-time instruction is measured from another time during the execution of a control frame. In some implementations, if the time to delay indicated in a delay-time instruction is less than the exposure time of an exposure of the control frame, then there can be no delay time between the control frame and the next executed control frame of the storyboard.

In some implementations, a delay instruction can include a delay condition instruction. A delay-condition instruction can indicate, to a device driver, to delay the execution of a control frame of the storyboard based on one or more delay conditions. For example, based on the execution of a delay-condition instruction, the execution of the next control frame to be executed in the storyboard can be delayed until one or more conditions indicated by the delay-condition instruction are satisfied. In some implementations, a delay of the execution of a control frame applied in response to a delay-condition instruction can be rounded to the nearest control frame boundary. In some implementations, a delay-condition instruction can include one or more values that indicate the delay condition that is to be satisfied before executing a next control frame. Values of a delay-condition instruction can be used in combination to indicate one or more conditions to be satisfied before executing a subsequent control frame. A delay-condition instruction can include a value that indicates to delay execution of the next control frame of a storyboard until a focus operation of a camera is complete. In some implementations, a delay-condition instruction can include a value that indicates to a device driver to delay execution of the next control frame of a storyboard until one or more ongoing camera operations are completed. For example camera operations can include a focus operation, an exposure operation, a zoom operation, an operation to adjust a white balance, or an operation to charge and/or ready a flash. In one implementation, a delay-condition instruction includes one or more values that indicate to a device driver to delay execution of the next control frame of a storyboard until one or more conditions are satisfied. In some implementations, a delay-condition instruction can override a delay-time instruction. For example, if a delay-time instruction is executed that indicates an amount of time to delay execution of a next control frame to be executed and a delay-condition instruction is also executed, then the execution of the next control frame can be delayed based on the delay-condition instruction and not according the indicated delay time of the delay-time instruction. In other implementations, an executed delay-condition instruction does not override an executed delay-time instruction.

Exemplary Best Effort Application of Instructions

In any of the examples herein an instruction of a control frame can be applied using a best effort application. In a best effort application of an instruction, a device driver can apply an instruction to a camera even if the setting or functionality begun by applying the instruction cannot be completed within the time for executing the control frame that contains the instruction. In some implementations of a best effort application of an instruction, if an instruction executed in a control frame does not override a previously executed instruction that started an ongoing operation in a previous control frame, then the device driver can continue to complete the ongoing operation. For example, a camera instruction in a control frame can start a focus operation that does not complete before the execution of the next control frame, if the next control frame does not include an instruction to perform a focus operation, then the focus operation begun by the previous control frame instruction can continue during the execution of the next control frame. In another implementation, if a subsequently executed control frame includes an instruction that applies a new value and overrides a currently executing operation begun by a previous control frame, then the currently executing operation can halt and the new value can be applied.

In some implementations of a best effort application of an instruction, the application of the instruction can fail to succeed and the instruction can be ignored and the storyboard can continue executing. When an instruction is ignored due to an application failure, a default value or a previous value applied to the camera for that property can be the active value for the camera. In some implementations, if a conflict arises between the application of one or more instructions of a storyboard, the instruction of the conflicting instructions that is parsed or executed last or later by the device driver can take priority over the previous conflicting instructions. For example, if a camera instruction for an exposure is followed by a camera instruction for setting a fixed frame rate, the latter instruction for setting the fixed frame rate can take precedence and be applied.

Exemplary Storyboard Payload Structure

Figure 7:
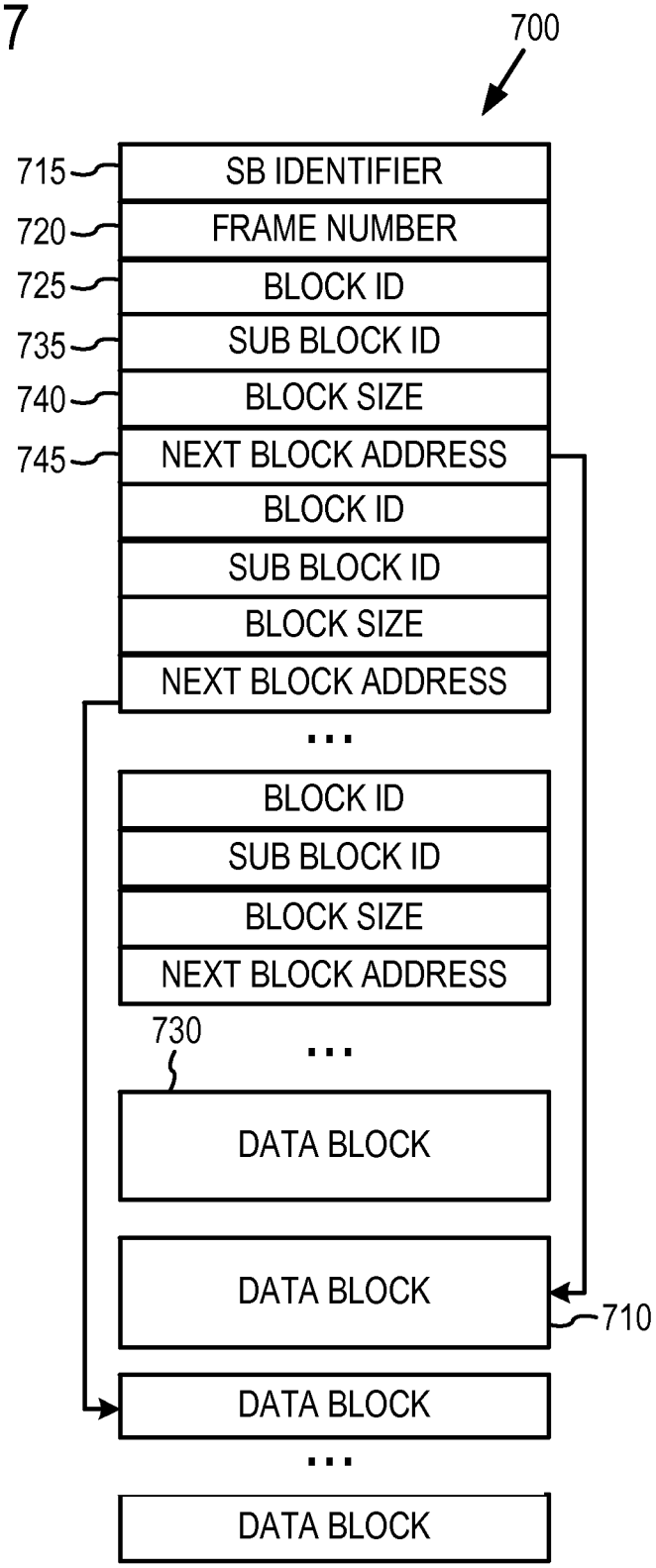
FIG. 7 is an exemplary implementation a storyboard payload.

FIG. 7 is an exemplary implementation of a storyboard payload 700 implemented using a flexible structure. For example, a storyboard can be executed and a sequence of image frames along with image statistics and metadata can be captured by a device driver in one or more storyboard payloads such as storyboard payload 700. The payload 700 can be returned to or sent to an application and/or an image processing pipeline or module by a device driver. The storyboard payload 700 includes data blocks that can include any of the data types returned to the device driver based on the execution of a control frame. For example, data blocks can include image metadata, camera settings information, image frames in one or more formats, contextual information for an image frame, image statistics, or other captured data. In some implementations, when image metadata capture is enabled for a storyboard, a storyboard payload for the storyboard can include image metadata for associated captured image frames. For example, in a storyboard payload with image metadata and image statistics, a first block of the storyboard payload can be a YUV or RAW formatted image frame, a second block can include Exif data for the image frame, and a third block can include image statistics for the image frame. A data block such as data block 710 included in the storyboard payload 700 can be associated with a block identifier, a sub-block identifier, a block size indicator, and an offset included in the payload 700.

The storyboard payload 700 includes a storyboard identifier 715 that identifies the storyboard that was executed to generate the data included in the storyboard payload. For example, the storyboard identifier 715 can include the identifier sent by an application to a device driver that identifies the storyboard executed to generate the data for the storyboard payload 700. Storyboard payload 700 includes a control frame identifier (control frame ID) 720. The control frame identifier can be the number or other identifier of the control frame in the storyboard that was executed to create the data included in the storyboard payload. In one exemplary implementation for a ZSL scenario, the control frame identifier is the number of the control frame of the storyboard that corresponds to the image that was marked by the driver. The storyboard payload 700 can include one or more block identifiers such as block identifier 725 that identifies the data block type of the data block 730 associated with the block identifier 725. For example, the block identifier 725 can identify a type of the data in data block 730. In some implementations, a type of data can include image frame data, image statistics, contextual data, Exif data, or other types of data that can be included in a storyboard payload. Also, the storyboard payload 700 can include one or more sub-block identifiers such as sub-block identifier 735 that is associated with data block 730. The sub-block identifier 735 can identify a subtype of the data included in the data block 730. In some implementations, the subtype indicated by a sub-block identifier can identify a type of image statistics data that can include post ISP image data, a histogram, ISP camera controls, pre-demosaiced RAW image data, idealized pre-demosaiced image data, or other subtypes of data that can be included in a storyboard payload. The storyboard payload 700 can include one or more block size indicators such as block size indicator 740 that indicates the block size of data block 730. For example, a block size can indicate the size of a data block. In some implementations, the block size is indicated in bytes and can exclude the size of the block header and/or padding. In other implementations, the block size includes the size of the block header and/or padding.

The storyboard payload 700 can include one or more offsets such as offset 745 that includes information about the address of a next data block in the structure of the storyboard payload 700. For example, the offset 745 can give an address leading to data block 710 which is the next data block in the storyboard payload 700 after data block 730. In some implementations, an offset can indicate that the last block in a storyboard payload is the last block. For example, the offset associated with the last block can include a NULL value indicating that a block is the last block of the storyboard payload, and no other data blocks follow the last block in the storyboard payload structure. An offset of a storyboard payload can be used by an application to determine where the next data block is located in a storyboard payload.

In one implementation, a storyboard payload can include payload descriptor information. For example, a storyboard payload can start with the payload descriptor information which can include the size of the payload descriptor information, a storyboard identifier associated with the storyboard payload, the number of data blocks included in the storyboard payload, a control frame identifier associated with the storyboard payload, a first data block in that array of data blocks of the storyboard payload, image format information, and/or other information.

Exemplary Mobile Device

Figure 8:
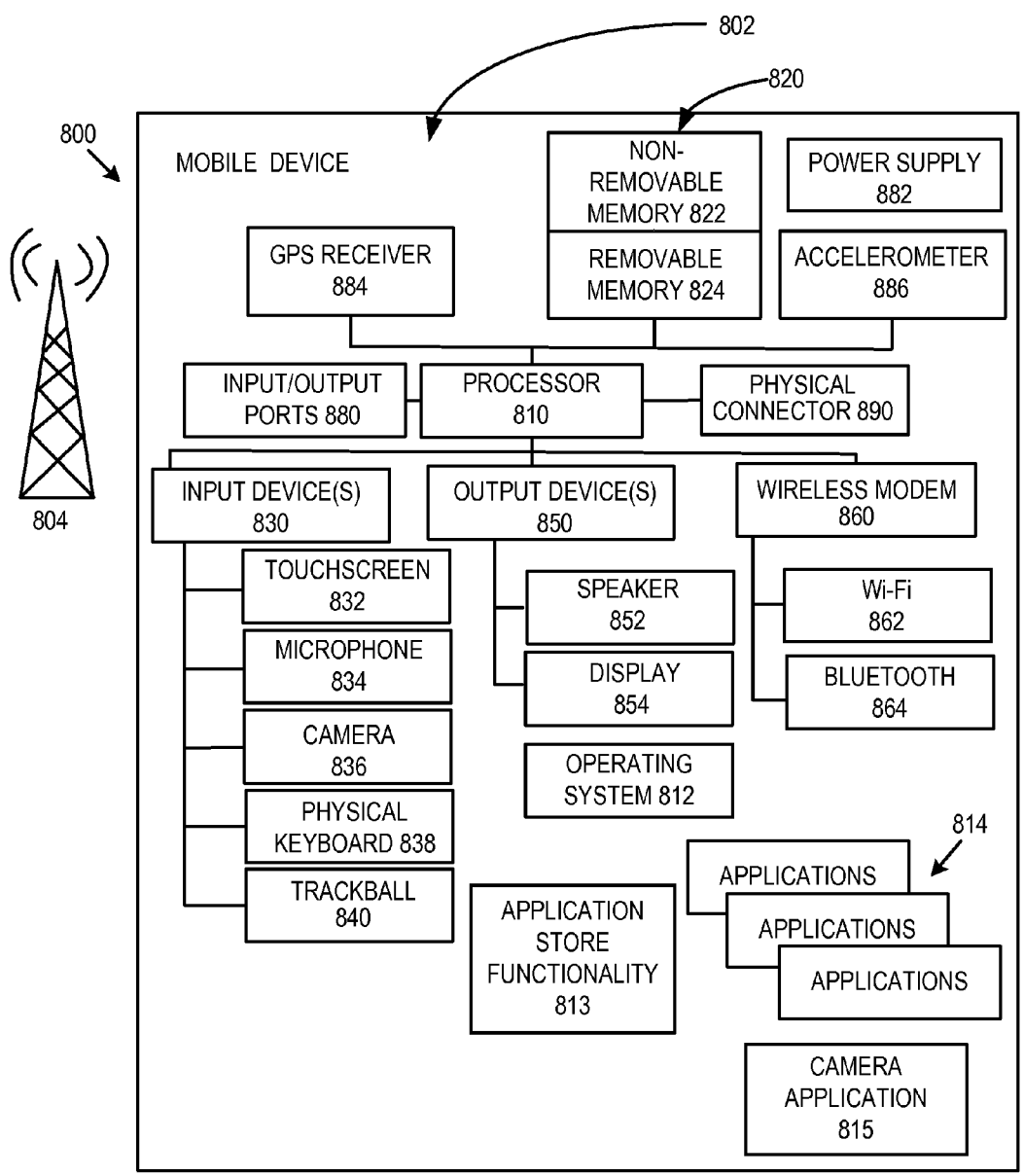
FIG. 8 is a schematic diagram illustrating an exemplary mobile device with which any of the disclosed embodiments can be implemented.

FIG. 8 is a system diagram depicting an exemplary mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), slate computer, tablet computer, etc.) and can allow wireless two-way communications with one or more mobile communications networks 804, such as a cellular or satellite network.

The illustrated mobile device 800 can include a controller or processor 810 (e.g., signal processor, microprocessor, ASIC, or other control and processing logic circuitry) for performing such tasks as signal coding, image processing, graphics processing, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications, camera applications, photo applications), or any other computing application. Functionality 813 for accessing an application store can also be used for acquiring and updating applications 814. One of the applications can be a camera application 815, as described herein.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, pictures, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, a gyroscope, and/or a physical connector 890, which can be a USB port, IEEE 1394 (FireWire) port, HDMI and/or RS-232 port. The illustrated components 802 are not required or all-inclusive, as any components can be deleted and other components can be added.

Exemplary Implementation Environment

Figure 9:
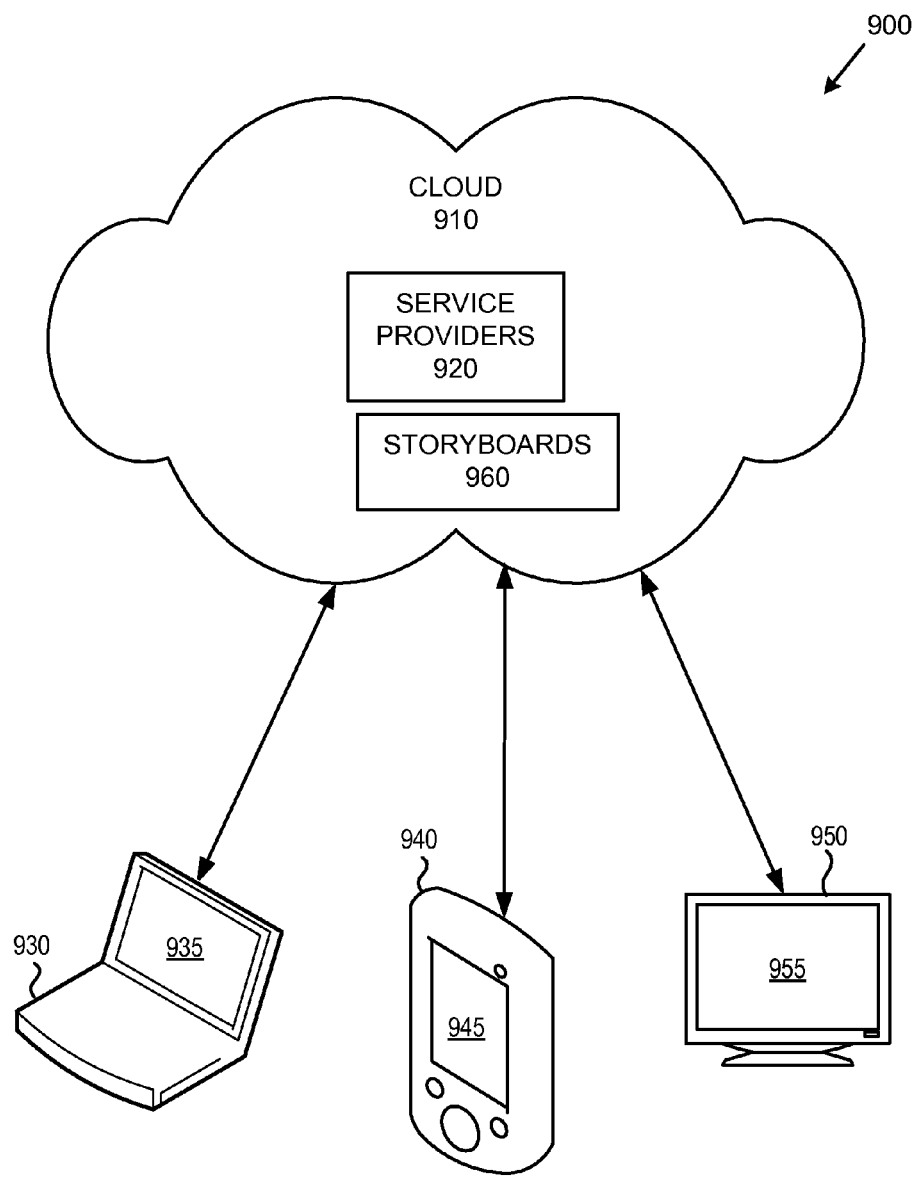
FIG. 9 is a schematic diagram illustrating a generalized example of a suitable implementation environment for any of the disclosed embodiments.

FIG. 9 illustrates a generalized example of a suitable implementation environment 900 in which described embodiments, techniques, and technologies herein described may be implemented. In example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, slate, tablet, notebook, netbook, or the like. Connected device 940 represents a device with a mobile device screen 945 (e.g., a small size screen). For example, connected device 940 could be a mobile phone, smart phone, personal digital assistant, tablet computer, or the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

The cloud environment can be extended to storyboarding as described herein. In particular, storyboards 960 can be stored in the cloud and passed to and between devices 930, 940, 950 to provide a cloud-based solution to digital photography.

Exemplary Computing Environment

Figure 10:
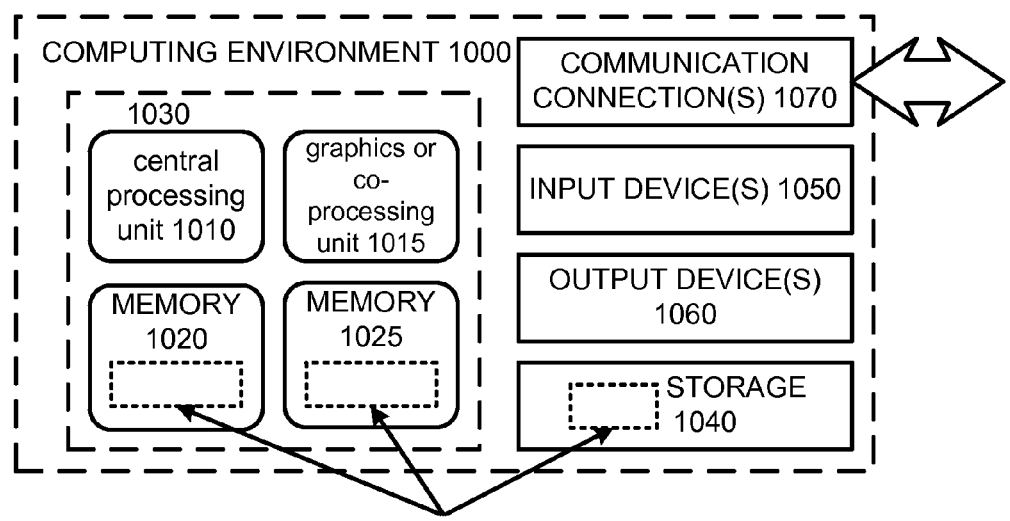
FIG. 10 is a schematic diagram illustrating a generalized example of a suitable computing environment for any of the disclosed embodiments.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, media player, digital camera device, gaming system, mobile device, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein, such as one or more storyboards or other innovations described herein.

The input device(s) 1050 may be a touch input device such as a keyboard, mouse, pen, or trackball, a voice input device, touch screen, a scanning device, or another device that provides input to the computing environment 1000. For video encoding, the input device(s) 1050 may be a camera, video card, TV tuner card, or similar device that accepts video input in analog or digital form, or a CD-ROM or CD-RW that reads video samples into the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of controlling a camera, comprising:
   storing a camera application in the camera;
   storing, by a camera driver, at least two storyboards received from the camera application during an initialization period so that the camera application builds imaging controls for capturing multishot images automatically by the camera driver;
   receiving, in the camera driver, a storyboard identifier from the camera application after the initialization period and during execution of the camera application;
   using the storyboard identifier and without further input from the camera application, retrieving a storyboard of the stored at least two storyboards, the storyboard comprising a sequence of control frames, each control frame including a set of instructions for controlling the camera including controlling camera settings and capturing a sequence of single image shots in accordance with the storyboard such that the camera application controls the sequence of single shots and the camera settings using the storyboard identifier; and
   capturing a sequence of images at least by controlling the camera using the retrieved storyboard.

2. The method of claim 1, wherein the retrieved storyboard further comprises at least one instruction for modifying the order that control frames of the sequence of control frames are executed.

3. The method of claim 1, wherein the storing of the at least two storyboards and the retrieving of the storyboard is performed by a device driver.

4. The method of claim 1, wherein the retrieved storyboard further comprises at least one instruction that indicates one or more formats in which image data is captured.

5. The method of claim 1, wherein the storyboard comprises at least one camera instruction for setting camera settings or causing the performance of an operation of the camera.

6. The method of claim 2, wherein the at least one instruction loops execution of the retrieved storyboard from one control frame to another control frame in the sequence of control frames until a condition is satisfied.

7. The method of claim 1, wherein the retrieved storyboard further comprises at least one instruction for delaying execution of a control frame of the sequence of control frames.

8. The method of claim 1, wherein the retrieved storyboard is a first storyboard and the using the retrieved storyboard comprises executing a second storyboard of the at least two storyboards based on an instruction in the first storyboard.

9. The method of claim 4, wherein the one or more types of image data comprises capture parameters of the camera for at least one image capture.

10. The method of claim 1 further comprising, synchronizing capture of contextual information with a capture of at least one of the images of the sequence of images.

11. The method of claim 1, wherein the retrieved storyboard further comprises at least one instruction that indicates an image format in which the at least one image of the sequence of images is to be returned to the camera application, wherein the image format comprises an idealized pre-demosaiced raw format, a demosaiced format, or a pre-demosaiced raw format.

12. The method of claim 1, wherein the capturing the sequence of images using the retrieved storyboard comprises, by a device driver, executing a control instruction and camera instructions in synchronization with one or more image captures.

13. The method of claim 1, wherein precedence of at least one instruction of the storyboard is based in part on an order the at least one instruction is executed in the storyboard.

14. A computing device that includes a processor and computer-readable media, the computer-readable media storing computer-executable instructions for causing the computing device to perform a method, the method comprising:
   receiving multiple storyboard identifiers in a device driver from a camera application program executing on the computing device to capture multishot or a stream of images;
   using the device driver, retrieving multiple storyboards using the storyboard identifiers, each storyboard comprising a plurality of control frames, each control frame including a plurality of instructions including one or more control instructions and a plurality of camera instructions for controlling camera settings and capturing a sequence of image shots; and
   capturing a sequence of images, the capturing the sequence of images comprising executing at least one control instruction from each storyboard to control the timing or order that at least one of the plurality of control frames is executed when capturing the sequence of images.

15. The computing device of claim 14, further comprising sending the storyboard from a camera application to the device driver during an initialization period.

16. The computing device of claim 14, wherein the control instruction comprises an instruction for looping to the at least one of the plurality of control frames and wherein capturing a sequence of images further comprises executing that at least one control frame of the plurality of control frames based on one or more executions of the at least one control instruction.

17. The computing device of claim 14, wherein the control instruction comprises an instruction for delaying the at least one of the plurality of control frames and wherein the capturing the sequence of images further comprises delaying one or more executions of the at least one of the plurality of control frames based on one or more executions of the control instruction.

18. One or more computer-readable nonvolatile storage devices storing computer-executable instructions for causing a computing device to perform a method, the method comprising:
- sending at least one storyboard from a camera application to a device driver, the camera application for capturing multiple images;
- using the device driver, caching the at least one storyboard, the at least one storyboard comprising a sequence of control frames for controlling a camera;
- receiving a request to execute the at least one storyboard from the camera application at the device driver, the request including an identifier of the at least one storyboard; and
- using the device driver, capturing a plurality of image frames at least by executing at least one control frame of the at least one storyboard corresponding to the received identifier, the at least one control frame including a set of instructions for controlling camera settings and for controlling the capturing of the plurality of image frames.

* * * * *